United States Patent [19]

Vanslette

[11] 4,191,059

[45] Mar. 4, 1980

[54] LINEAR ACTUATOR

[75] Inventor: Robert A. Vanslette, Medfield, Mass.

[73] Assignee: Brown & Sharpe Manufacturing Company, North Kingstown, R.I.

[21] Appl. No.: 844,582

[22] Filed: Oct. 25, 1977

[51] Int. Cl.² .............................................. F16H 21/40
[52] U.S. Cl. ................................................... 74/25
[58] Field of Search ................... 74/25, 193, 194, 196, 74/197, 198; 64/4

[56] References Cited

U.S. PATENT DOCUMENTS

| | | | |
|---|---|---|---|
| 3,425,284 | 2/1969 | Shelton | 74/25 |
| 4,034,613 | 7/1977 | Halfhill | 74/25 |

Primary Examiner—Samuel Scott
Assistant Examiner—Wesley S. Ratliff, Jr.
Attorney, Agent, or Firm—Barlow & Barlow

[57] ABSTRACT

A linear actuator for converting rotary motion to linear motion including an elongated rotary threadless shaft and a rider assembly mounted for movement axially of the shaft and carrying rollers mounted for rotation about their respective axes with their surface in frictional contact with the shaft. The roller's axes are disposed at an acute angle with respect to the shaft so that as the shaft is rotated the rider assembly will move along the shaft and carry with it such parts to which it may be attached.

5 Claims, 6 Drawing Figures

LINEAR ACTUATOR

BACKGROUND OF THE INVENTION

Linear actuators have been heretofore provided and are commercially available in which two sets of rollers, each set around the central drive shaft and skewed with respect to the axis of the shaft so that as the shaft rotates the rollers contact the shaft and relatively move the shaft and rollers axially. The rider assembly thus advances along the shaft as the shaft rotates. The rollers are held in contact with the shaft by spring pressure that urges the two halves of the actuator or rider toward each other such as in U.S. Pat. No. 3,272,021. This device has several features including low cost pitch selection by simply changing the roller skew angle and automatic load protection by setting the closing spring load. After a period of time, however, it causes jamming due to bearing failure and does not solve the problem of remote disengagement nor provide means for passing over bearings supporting a long shaft. At other times the linear actuator has been provided in which a block was partly severed leaving a hinge to act between the two severed parts of the block with means to expand the two parts of the block for release of rolls carried by the block such as in U.S. Pat. No. 3,425,284. This arrangement is costly to manufacture and keep in repair.

SUMMARY OF THE INVENTION

According to this invention, there is a threadless shaft which is embraced by a rider assembly having rollers which are at a skew angle to the axis of the shaft so that as the shaft is rotated, the rollers drive the rider assembly axially of the shaft. The rider assembly has two members which are bodily slidably related, one of these members carrying at both of its ends a pair of skewed rollers spaced to engage at different circumferential points about the shaft, while the other member carries a single skewed roller slightly below the axis of the shaft, there being a spring urging the two members carrying these rollers toward each other so that the rollers engage the shaft in a firm frictional relation. In this case in order that there may be a remote control of the rollers for freeing the shaft for movement of the rider axially of the shaft, there is a cylinder fixed or contained within one of the members and a piston slidable in that cylinder and engaging the other of the members, there being a conduit for conducting fluid through the piston into the cylinder so that this fluid under pressure will bodily slide the members relative to each other so as to free the roller slightly below the axis of the shaft from engagement therewith and at the same time bodily move both members to free the pairs of rollers from the shaft which, with adjustment, may be made to free the shaft completely for manual movement of the movable part of a machine to the desired location.

DESCRIPTION OF THE PREFERRED EMBODIMENT

Figure 1:
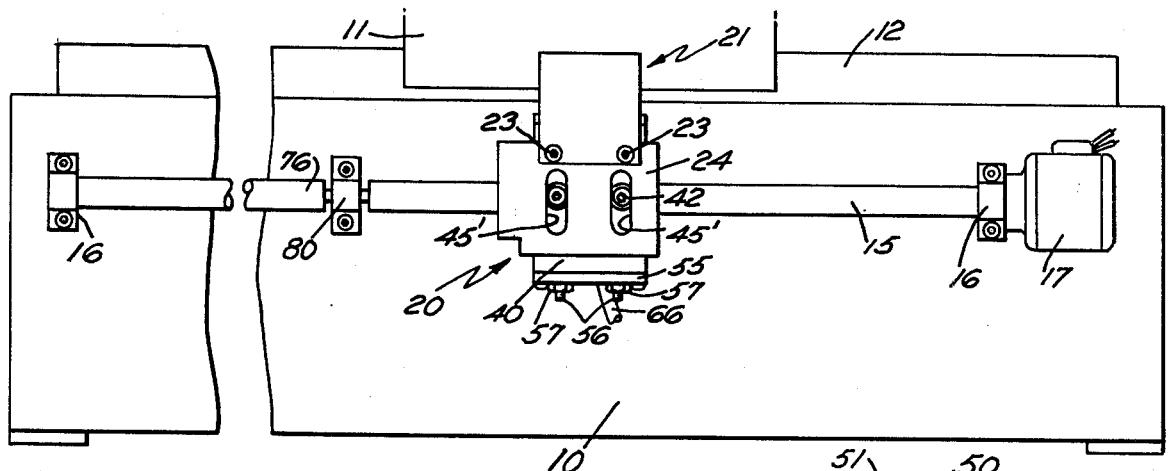
FIG. 1 is an elevational view of a part of a machine showing the linear actuator mounted thereon and two sections of a drive shaft.

With reference to FIG. 1 the fixed portion of a machine is designated as 10 and the movable portion 11, which moves along the guide ways 12, portion 11 being moved by the linear actuator of this invention.

Figure 5:
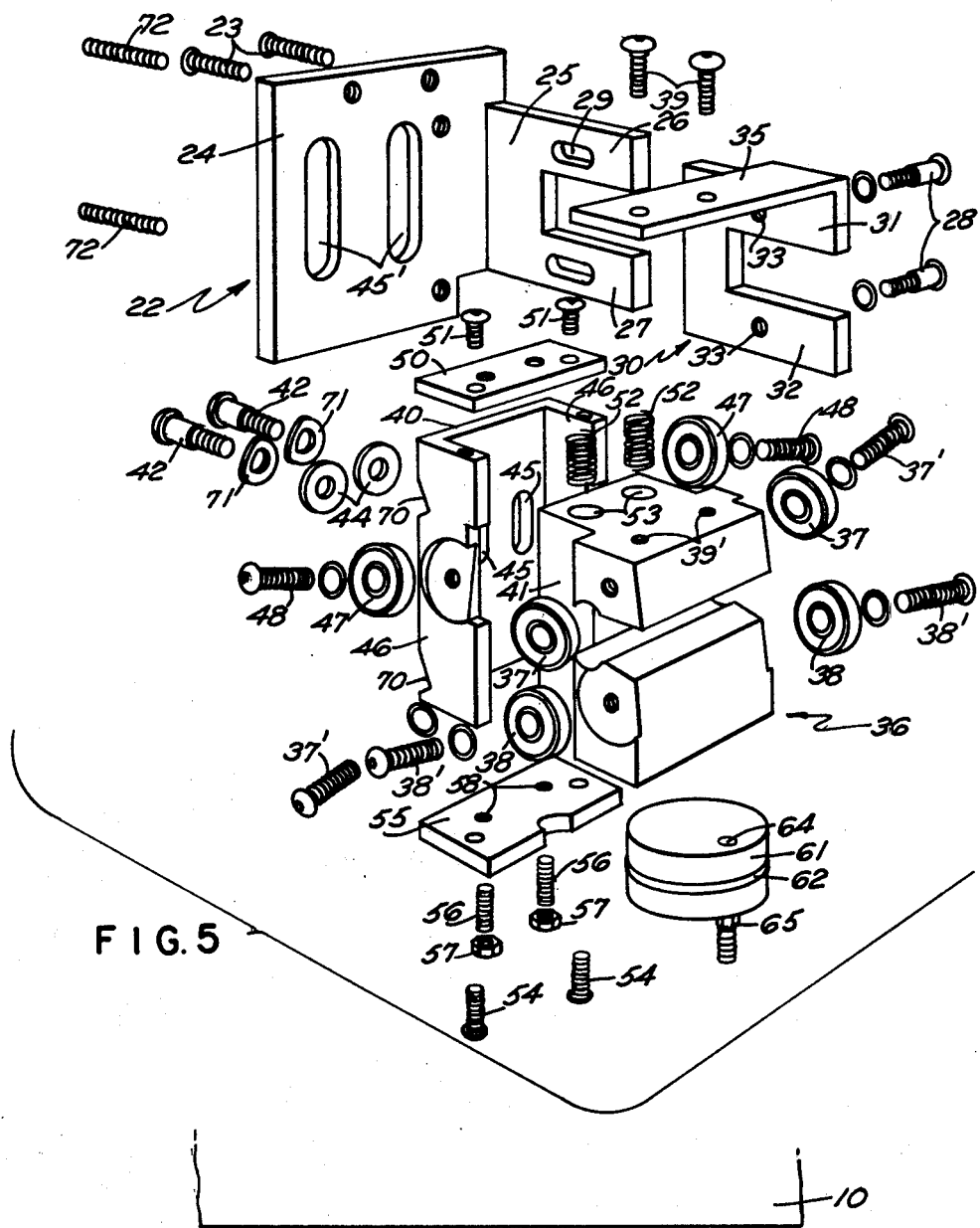
FIG. 5 is an exploded view of the various parts of the rider assembly and its brackets for mounting upon the movable part of the machine.

The linear actuator comprises a shaft 15 mounted in suitable bearings 16 and driven by an electric motor 17 on the fixed portion 10 of the machine. A rider assembly designated generally 20 is mounted on shaft 15 and is suitably attached to the movable portion 11 of the machine by a support 21. An outer bracket 22 as seen best in FIG. 5 is screwed to the support 21 by means of screws 23 entering a plate portion 24 thereof. This outer bracket has a second or right-angularly extending portion 25 which provides arms 26 and 27. A second or inner bracket 30 has arms 31 and 32 which are slidably held to the arms 26 and 27 by shoulder screws 28 passing through slots 29 in arms 26 and 27 and engaging threaded holes 33 in the arms 31 and 32. This inner bracket 30 has an arm 35 extending at right angles to the arms 31 to which is mounted a block 36 by means of screws 39 entering threaded holes 39' which block hangs beneath this arm 35. This block carries a pair of outer rolls 37 and 38 at each of its ends, 37 being the upper rolls and 38 the lower rolls. These rollers are mounted on skewed axes by screws 37' and 38' which are at an acute angle to the axis of the shaft 15 which they are to engage.

Figure 4:
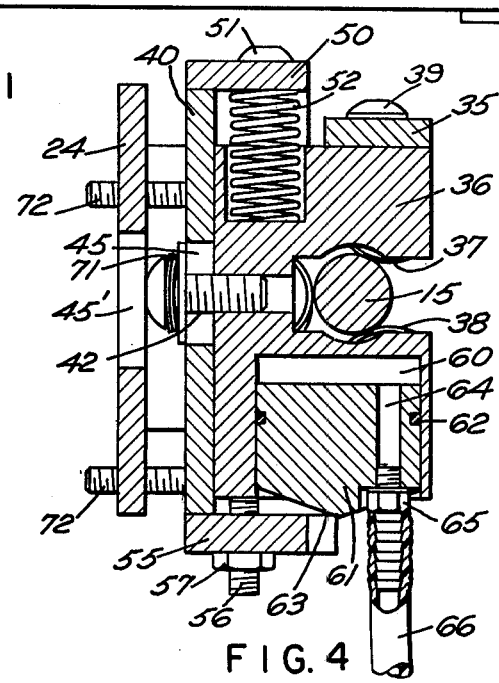
FIG. 4 is a sectional view substantially central of the rider assembly shown in FIG. 3.

A guide 40 is generally channel shape as seen in FIG. 5 and fits about the reduced rear portion 41 of the block 36 in a slidable relation thereto and is held in this slidable relation by shouldered screws 42 having spring washers 71 and washers 44 passing through elongated slots 45 and threaded into the block 36 (FIG. 4). Slots 45' are formed in the plate 24 of the bracket 22 so as to accommodate the heads of these screws 42 as the guide 40 has sliding movement with reference to the block 36. The sides 46 of this channel guide 40 mount inner rolls 47 (see also FIG. 2) by means of the screws 48, there being such a roller on each of the two sides 46 of the guide 40. These rollers 47, however, as may be seen best possibly in FIG. 2, have their skewed axes slightly below the axis of the shaft 15. A top plate 50 is secured across the top of this channel shape guide 40 by means of screws 51 entering the edges of the sides 46 and springs 52 seated in sockets 53 in the top of block 36 engaged the under surface of plate 50 and move the guide 40 upwardly so that the roll 47 will engage the shaft 15 and will move the assembly against the two rolls 37 and 38 on the block 36.

A bottom plate 55 is secured to the lower edges of the channel guide 40 by screws 54 and set screws 56 with lock nuts 57 are threaded through openings 58 in the bottom plate 55 so as to engage the bottom of the block 36 and limit the upward movement of the guide under action of the springs 52. In view of the slots 45 in the guide and 29 in the bracket 22 the rider assembly will center itself about the axis of the shaft 15.

Figure 2:
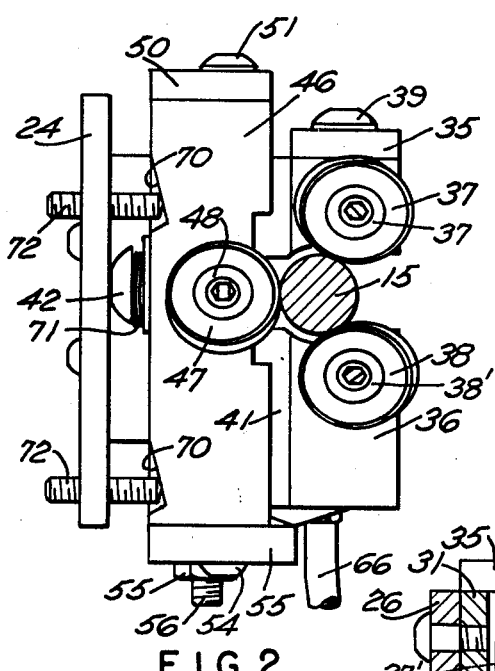
FIG. 2 is an elevation of the rider assembly embracing the shaft, which shaft is shown in section.
Figure 3:
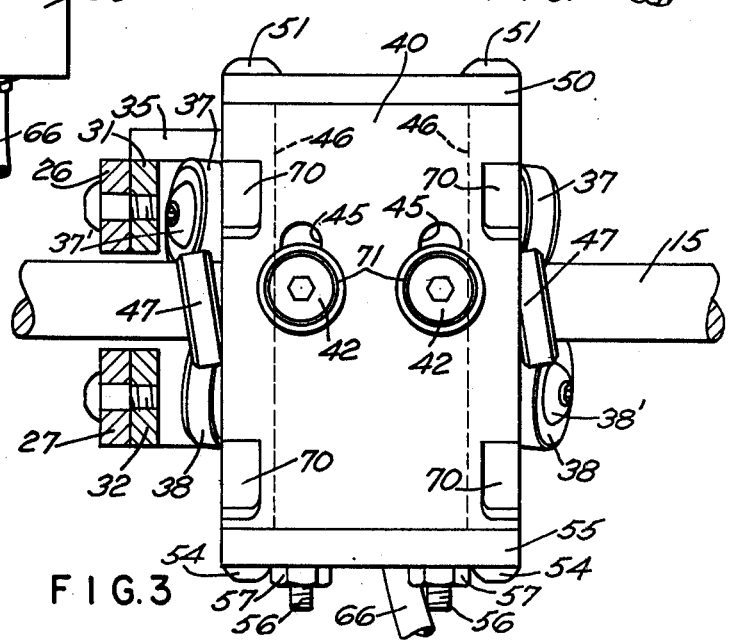
FIG. 3 is a rear view of the rider assembly with the shaft broken off.

The block 36 has a cylindrical recess in its lower surface (see FIG. 4) forming a cylinder 60. A piston 61 having an O-ring 62 in its side wall is slidable in this cylinder 60 and the lower portion 63 of this piston engages the bottom wall 55 of the guide 40. The piston has a conduit 64 through it and a fitting 65 which may engage a flexible tube 66 so that when fluid such, as air under pressure, is applied from some remote point if desired, the piston will move downwardly as seen in FIG. 4 and will force the guide 40 against the action of the springs 52 downwardly and as the roll 47, as seen in FIG. 2, is slightly below the horizontal axis of the shaft 15 the roll will be relieved from frictional engagement with the shaft 15. However, at the same time that the guide 40 is moved downwardly by reason of the fact that there are inclined notches 70 (FIG. 2) in the rear portion of the sides 46 of this guide, which engage pins 72 (threaded for adjustment in plate) the block member 36 and the guide member 40 both will be moved forwardly or to the right as seen in FIGS. 2 and 4 so that the outer rolls 37 and 38 will move to the right away from the shaft 15 and thereby completely free the shaft 15 so that the rider assembly with the movable portion of the machine 11 may be easily slid by hand to any desired position.

When it is desired to again cause the shaft to be gripped by the rolls of the rider assembly it is merely necessary to release the pressure in the cylinder 60 whereupon the springs 52 will raise the guide so that the roll 47 will engage the shaft and move the two members of the assembly to the left as shown in FIGS. 2 and 4 against the springs 71 of the screws 42 which span the slots 45 in the guide and there will thus bring the outer rolls 37 and 38 again into engagement with the shaft 15.

Figure 6:
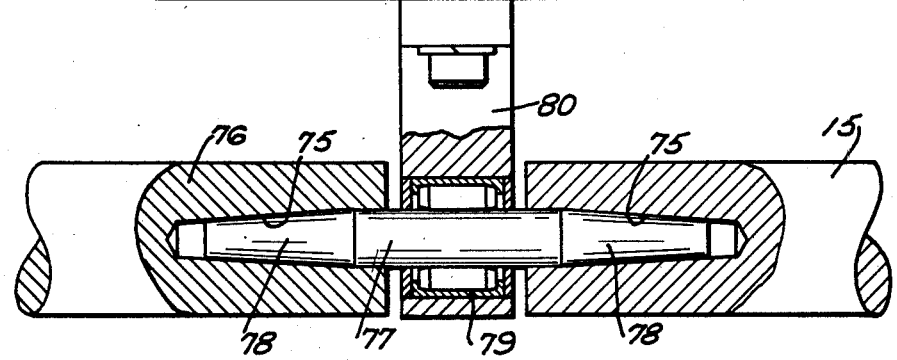
FIG. 6 is an elevation partly broken away of the connecting means of two shaft sections and the bearing for supporting the connecting means.

In case the shaft 15 is to be of extended length or if it is desired to lengthen the shaft 15 and at the same time provide a support for it so that it will not sag, the end of the shaft has a tapered recess 75 (see FIG. 6) and the shaft 76 to be joined will have a like tapered recess. A pin 77 having tapers 78 corresponding to the tapers of the recess may be used to join the two parts of the shaft, while at the same time this tapered pin may be mounted in a roller bearing 79 mounted in a housing 80 and secured to the fixed part of the machine 10. The shaft in this way may be indefinitely extended and provided with a supporting bearing at each juncture so that it will not sag and yet will drive sufficiently to cause the linear actuator to be driven. By joining the shaft in this way the rider assembly may pass over the junction of the shafts without interference and with a smooth action which is desired in a machine of this character.

I claim:

1. Transducer for transducing a rotational movement of a shaft into a linear movement of an actuator, the transducer having a rider assembly mounted for movement axially on the shaft, the rider assembly comprising two members and three rollers with their circumference in frictional contact with the shaft, the roller axes being disposed at an acute angle with respect to the shaft axis and spaced circumferentially around the shaft, a means mounting these two members of the rider assembly relatively movable with respect to each other, one of these members carrying a roller on one side of the shaft axis and the other member carrying two rollers on the other side of the shaft axis, a spring arrangement for relatively moving these members until the rollers carried thereby are in frictional contact with the shaft, and a means to relatively move these members to relieve frictional engagement of one of the rollers with the shaft, characterized in that the means for relatively moving the two members of the rider assembly comprises a cylinder fixed relatively to the one member and a piston movable in the cylinder and engaging the other member, and a conduit to the cylinder for introducing a pressurized fluid for the relative movement of the two members.

2. Transducer as in claim 1, characterized in that the conduit passes through the piston.

3. Transducer as in claim 1, characterized by a means responsive to the relative movement of the two members to move both members relative to the shaft such that at least another roller is relieved from engagement with the shaft.

* * * * *